(12) United States Patent
Sze

(10) Patent No.: US 6,690,354 B2
(45) Date of Patent: Feb. 10, 2004

(54) METHOD FOR ENHANCING PERFORMANCE IN A SYSTEM UTILIZING AN ARRAY OF SENSORS THAT SENSE AT LEAST TWO-DIMENSIONS

(75) Inventor: Cheng-Feng Sze, Cupertino, CA (US)

(73) Assignee: Canesta, Inc., San Jose, CA (US)

( * ) Notice: Subject to any disclaimer, the term of this patent is extended or adjusted under 35 U.S.C. 154(b) by 247 days.

(21) Appl. No.: 09/997,493

(22) Filed: Nov. 19, 2001

(65) Prior Publication Data

US 2002/0060669 A1 May 23, 2002

Related U.S. Application Data

(60) Provisional application No. 60/252,166, filed on Nov. 19, 2000.

(51) Int. Cl.[7] .................................................. G09G 5/00
(52) U.S. Cl. ..................... 345/156; 345/173; 345/168; 345/172; 382/106
(58) Field of Search ........................ 345/156–179; 463/37–38; 382/106, 276, 293, 291

(56) References Cited

U.S. PATENT DOCUMENTS

| | | | | |
|---|---|---|---|---|
| 5,448,263 A | * | 9/1995 | Martin | 345/173 |
| 5,627,565 A | * | 5/1997 | Morishita et al. | 345/158 |
| 5,767,842 A | | 6/1998 | Korth | 345/168 |
| 5,933,132 A | * | 8/1999 | Marshall et al. | 345/158 |
| 6,104,387 A | * | 8/2000 | Chery et al. | 345/179 |
| 6,252,598 B1 | * | 6/2001 | Segen | 345/358 |
| 6,323,942 B1 | * | 11/2001 | Bamji | 356/5.01 |
| 6,424,334 B1 | * | 7/2002 | Zimmerman et al. | 345/158 |
| 6,512,838 B1 | * | 1/2003 | Rafii et al. | 382/106 |
| 6,522,312 B2 | * | 2/2003 | Ohshima et al. | 345/8 |
| 6,614,422 B1 | * | 9/2003 | Rafii et al. | 345/168 |

* cited by examiner

Primary Examiner—Lun-Yi Lao
(74) Attorney, Agent, or Firm—Dorsey & Whitney LLP

(57) ABSTRACT

In a three-dimensional data acquisition system, coordinate transformation and geometric error correction are avoided by representing data in a sensor array coordinate system (i,j,k) rather than a conventional (x,y,z) coordinate system. A preferably point-sized sub-region is defined for each potential region of interest for a virtual input device subject to interaction with a user-controlled object. The (i,j,k) coordinate system used relates to raw data, and correction for several types of geometric error and optical lens error are avoided by determining interaction with such raw coordinate data. As a result, substantial processing overhead may be avoided.

20 Claims, 5 Drawing Sheets

METHOD FOR ENHANCING PERFORMANCE IN A SYSTEM UTILIZING AN ARRAY OF SENSORS THAT SENSE AT LEAST TWO-DIMENSIONS

RELATIONSHIP TO PENDING APPLICATIONS

Priority is claimed from co-pending U.S. provisional patent application serial No. 60/252,166 filed Nov. 19, 2000, entitled "A Simple Technique for Reducing Computation Cost and Overcoming Geometric Error & Lens Distortion in 3-D Sensor Applications".

FIELD OF THE INVENTION

The invention relates generally systems that use an array of sensors to detect distances in at least two dimensions, and more specifically to enhancing performance of such system by reducing computational overhead, overcoming geometric error, elliptical error, and lens distortion.

BACKGROUND OF THE INVENTION

FIG. 1 depicts a generic three-dimensional sensing system 10 that includes a pulsed light source 20 some of whose emissions 30 strike a target object 40 and are reflected back as optical energy 50. Some of the reflected energy 50 passes through a lens 60 and is collected by at least some three-dimensional sensors 70i,j in a sensor array 80, where i,j represent indices. An electronics system 90 coordinates operation of system 10 and carries out signal processing of sensor-received data. An exemplary such system is described in U.S. patent application Ser. No. 09/401,059 "CMOS-Compatible Three-dimensional Image Sensor IC", now U.S. Pat. No. 6,323,942(2001).

Within array 80, each imaging sensor 70$i,j$ (and its associated electronics) calculates total time of flight (TOF) from when a light pulse left source 20 to when energy reflected from target object 40 is detected by sensor 80. Surface regions of target 40 are typically identified in (x,y,z) coordinates. Different (x,y,z) regions of target object 40 will be imaged by different ones of the imaging sensors 70$ij$ in array 80. Data representing TOF and/or brightness of the returned optical energy is collected by each senor element (i,j) in the array, and may be referred to as the data at sensor pixel detector (i,j). Typically, for each pulse of optical energy emitted by source 20, a frame of three-dimensional image data may be collected by system 10.

FIG. 2 depicts one potential application for system 10, in which system 10 attempts to detect the spatial location of interaction between a virtual input device 100 (here shown as a virtual keyboard) and a user-controlled object 110 (here shown as a user's hand). Virtual input device 100 may be simply an image of an input device, such as a keyboard. As the user 110 "types" on the image, system 10 attempts to discern in the (x,y,z) coordinate system which keys on an actual keyboard would have been typed upon by the user.

Typically an image representing the surface of virtual input device 110 will have been stored in (x,y,z) coordinates in memory within system 10. For example in FIG. 2, the user's left forefinger is shown contacting (or typing upon) the region of the virtual input device where the "ALT" character would be located on an actual keyboard. In essence, regions of contact or at least near contact between user-controlled object 110 and the virtual input device 110 are determined using TOF information. Pixel detector information from sensor array 80 would then be translated to (x,y,z) coordinates, typically on a per-frame of data acquired basis. After then determining what region of device 110 was contacted, the resultant data (e.g., here the key scancode for the ALT key) would be output, if desired, as DATA to an accessory device, perhaps a small computer. An example of such an application as shown in FIG. 2 may be found in co-pending U.S. patent application Ser. No. 09/502,499 entitled "CMOS-Compatible Three-dimensional Image Sensor IC", assigned to assignee herein.

Unfortunately several error mechanisms are at work in the simplified system of FIG. 2. For example, geometric error or distortion is present in the raw data acquired by the sensor array. Referring to FIGS. 3A and 3B, geometric or distortion error arises from use of distance measurement D at pixel (i,j) as the z-value at pixel (i,j). It is understood that the z-value is distance along the z-axis from the target object 40 or 110 to the optical plane of the imaging sensor array 80. It is known in the art to try to compensate for geometric error, by transforming the raw data into (x,y,z) coordinates using a coordinate transformation that is carried out on a per-pixel basis. Such coordinate transformation is a transformation from one coordinate system into another coordinate system.

FIG. 3C depicts another and potentially more serious geometric error, namely so-called elliptical error. Elliptical error results from approximating imaging regions of interest as lying on planes orthogonal to an optical axis of system 10, rather than lying on surfaces of ellipsoids whose focal points are optical emitter 20 and optical sensor 80. Elliptical error is depicted in FIG. 3C with reference to points A and point B, which are equal light travel distances from optical energy emitter 20 shown in FIG. 1. Referring to FIG. 3C, optical source 20 and sensor array 80 are spaced-apart vertically (in the figure) a distance 2$c$. Further, points A and point B each have the same light traveling distance 2$d$, e.g., $r_1+r_2=2d$, and $r'_1+r'_2=2d$. In mapping distance values to planes in a three-dimensional grid, points A and B, which have the same distance value from the optical plane, may in fact map to different planes on the three-dimensional grid. Thus while points A and B both lie on the same elliptical curve Ec, point A lies on plane $P_a$ while point B lies on a parallel plane $P_b$, a bit farther from the optical plane than is plane $P_a$. Thus to properly determine (x,y,z) coordinate information for point A and point B requires a further correction.

Unfortunately, computational overhead or cost associated with various coordinate transformations and other corrections may be high. For example assume that array 80 includes 100 rows and 100 columns of pixel detectors 70$i,j$ (e.g., $1 \leq i \leq 100$, $1 \leq j \leq 100$). Thus, a single frame of three-dimension data acquired for each pulse of energy from emitter 20 includes information from 10,000 pixels. In this example, correcting for geometric or distortion error requires performing 10,000 coordinate transformations for each frame of data acquired. If the frame rate is 30 frames per second, the computational requirement just for the coordinate transformations will be 300,000 coordinate transformations performed within each second.

In addition to the sheer number of transformations required to be calculated per second, coordinate transformation typically involves use of floating-point calculation and/or memory to store transformation tables. Thus, the necessity to perform a substantial number of coordinate transformations can be computationally intensive and can require substantial memory resources. However in applications where system 10 is embedded system, the available computational power and available memory may be quite low. But even if the overhead associated with increased computational power and memory is provided to carry-out coordinate transformation, correction to geometric error does not correct for distortion created by lens 60.

Lens distortion is present on almost every optical lens, and is more evident on less expensive lens. Indeed, if system 10 is mass produced and lens 20 is not a high quality lens, the problem associated with lens distortion cannot generally be ignored. FIG. 4A depicts a cross-hatch image comprising parallel and vertical lines. FIG. 4B depicts the image of FIG. 4A as viewed through a lens having substantial barrel distortion, while FIG. 4C depicts the image of FIG. 4A as viewed through a lens having substantial pincushion distortion. Barrel distortion and pin cushion distortion are two common types of lens distortion. An additional type of lens distortion is fuzziness, e.g., imaged parallel lines may not necessary be distorted to bow out (FIG. 4B) or bow in (FIG. 4C), yet the resultant image is not optically sharp but somewhat fuzzy.

It is known in the art to correct non-linear lens distortion such as barrel and pincushion lens distortion using non-linear numerical transformation methods that are carried out on a per-pixel basis. While such transformation can indeed compensate for such non-linear lens distortion, the computational overhead cost can be substantial. Further, in an embedded application characterized by low computational power, the ability to correct for these two types of lens distortion may simply not be available. (Correction for fuzziness lens distortion is not addressed by the present invention.)

Thus, for use with a system having an array of detectors, defined in (i,j,k) coordinate space, to acquire at least two-dimensional information representing user-controlled object interaction with a virtual input device, traditionally represented in (x,y,z) coordinate space, there is a need for a new method of analysis. Preferably such method should examine regions of the virtual input device and statically transforms sub-regions of potential interest into (i,j,k) detector array coordinates. Determination as to what regions or sub-regions of the virtual input device have been interacted with by a user-controlled object may then advantageously be carried out in (i,j,k) domain space.

Further, there is a need for a method to reduce computational overhead associated with correction of geometric error, non-linear barrel and pincushion type lens distortion, and elliptical error in such a system that acquires at least two-dimensional data. Preferably such method should be straightforward in its implementation and should not substantially contribute to the cost or complexity of the overall system.

The present invention provides such a method.

SUMMARY OF THE INVENTION

The present invention provides a methodology to simplify operation and analysis overhead in a system that acquires at least two-dimensional information using a lens and an array of detectors. The information acquired represents interaction of a user-controlled object with a virtual input device that may be represented in conventional (x,y,z) space coordinates. The information is acquired preferably with detectors in an array that may be represented in (i,j,k) array space coordinates.

In one aspect, the invention defines sub-regions, preferably points, within the virtual input device reduces computational overhead and memory associated with correcting for geometric error, elliptical error, and non-linear barrel and pincushion type lens distortion in a system that acquires at least two-dimensional information using a lens and an array of detectors. Geometric error correction is addressed by representing data in the sensor array coordinate system (i,j,k) rather than in the conventional (x,y,z) coordinate system. Thus, data is represented by (i,j,k), where (i,j) identifies pixel (i,j) and k represents distance. Distance k is the distance from an active light source (e.g., a light source emitting optical energy) to the imaged portion of the target object, plus the return distance from the imaged portion of the target object to pixel (i,j). In the absence of an active light source, k is the distance between pixel (i,j) and the imaged portion of the target object.

Advantageously using the sensor coordinate system avoids having to make coordinate transformation, thus reducing computational overhead and cost and memory requirements. Further, since the sensor coordinate system relates to raw data, geometric error correction is not applicable, and no correction for geometric error correction is needed.

In another aspect, the present invention addresses non-linear barrel and pincushion type lens distortion effects by simply directly using distorted coordinates of an object, e.g., a virtual input device, to compensate for such lens distortion. Thus, rather than employ computational intensive techniques to correct for such lens distortion on the image data itself, computation cost is reduced by simply eliminating correction of such lens distortion upon the data. In a virtual keyboard input device application, since the coordinates of all the virtual keys are distorted coordinates, if the distorted image of a user-controlled object, e.g., a fingertip, is in close proximity to the distorted coordinate of a virtual key, the fingertip should be very close to the key. This permits using distorted images to identify key presses by using distorted coordinates of the virtual keys. Thus, using distorted key coordinates permits software associated with the virtual input device keyboard application to overcome non-linear pincushion and barrel type lens distortion without directly compensating for the lens distortion.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 5:
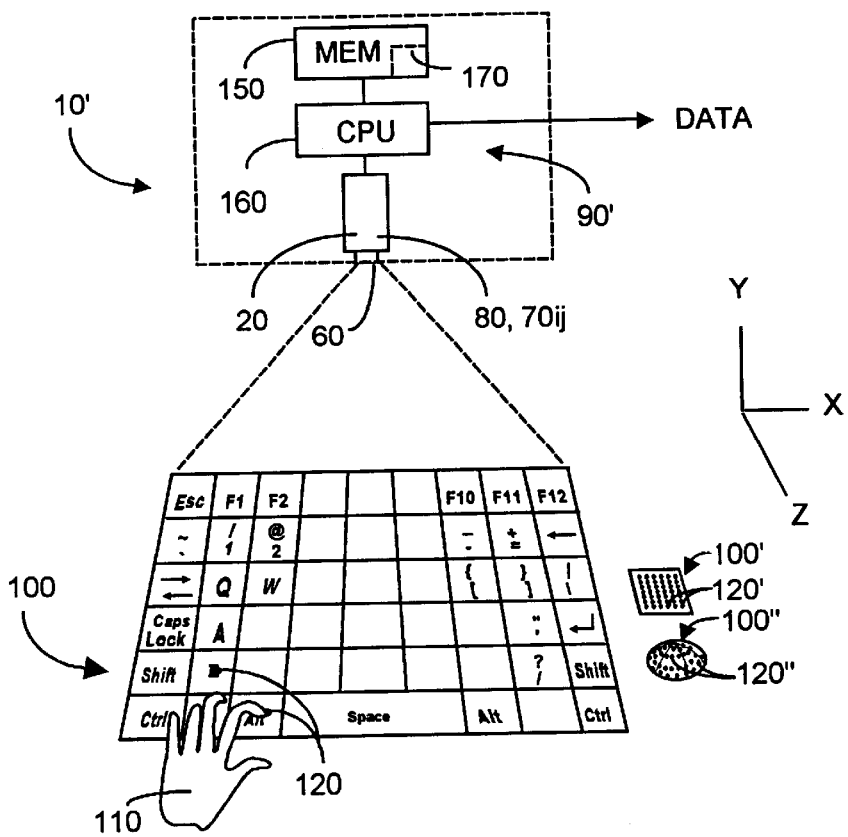
FIG. 5 depicts an electronics control system and use of distorted coordinates, according to the present invention.

In overview, FIG. 5 depicts a system 10' in which energy transmitted from emitter 20 impinges regions of interest within the field of view of system 10', and is at least partially reflected back via an optional lens 60 to an array 80 of preferably pixel detectors 70$i,j$. A region of interest may be considered to be a zone that ranges from the vertical plane of virtual input device 100 upward for perhaps 12 mm or so. In practice, system 10' seeks to learn when and where a user-controlled object (e.g., hand 110, stylus or other object held by the user 40) approaches the surface of a virtual input device a virtual input device (e.g., a virtual keyboard 100, and/or a virtual trackpad 100', and/or a virtual trackball 100") within the region of interest and thus interacts with the virtual input device. When the y-axis distance between the plane of the virtual input device and the user-controlled object is essentially zero, then the user-controlled object may be said to have intersected or otherwise interacted with a region, e.g., a virtual key in FIG. 5, on the virtual input device. Interaction is sensed, for example by pixel photo-detectors 70$i,j$ within a detector array 80. Conventionally detector array 80 is definable in (i,j,k) coordinate space, whereas the virtual input device is definable in (x,y,z) coordinate space.

The notion of a virtual controlled device is very broad. For example and without limitation, a user-controlled object (e.g., 110) may be moved across virtual device 100" to "write" or "draw" and/or to manipulate an object, e.g., a cursor on a display, or to select a menu, etc. The virtual trackball/mouse device 100" may be manipulated with a user's hand to produce movement, e.g, a cursor on a display, to select a menu on a display, to manipulate a drawing, etc. Thus not only is the concept of virtual input device broad, and but interactions of a user-controlled object with a virtual input device are also broad in their scope.

Referring still to FIG. 5, system 10' includes electronics 90' that preferably comprises at least memory 150, a processor unit (CPU) 160, and software 170 that may be stored or loadable into memory 150. CPU 160 may be an embedded processor, if desired, for example a 48 MHz 80186 class processor. CPU 160 preferably executes software stored or loadable in MEM 150, e.g., a portion of software 170, to determination interaction information.

In one aspect of the present invention, preferably point-sized sub-regions (e.g., sub-regions 120 in device 100, sub-regions 120' in device 100', sub-regions 120" in device 100") are defined at areas or regions of interest within the virtual input device. Without limitation, the effective area of the sub-region 120 is preferably a single point, e.g., a very small fraction of the effective area of the virtual key, typically much less than 1% of the virtual key area. In FIG. 5, a point-sized sub-region 120 preferably is defined at central location of each virtual key on the virtual keyboard device. For ease of illustration, only a few sub-regions 120 are shown, but it is understood that each region of interest will include at least one sub-region 120. For the case of a virtual trackpad input device 100', an array of sub-regions 120' will be defined with a granularity or pitch appropriate for the desired interaction resolution. For a virtual trackball input device 100", a three-dimensional array of sub-regions 120" will be defined. (See also FIG. 6.)

In another aspect, the present invention carries out an inverse-transformation of the sub-regions 120, 120', 120" from (x,y,z) coordinate space associated with the virtual input device to (i,j,k) coordinate space associated with the array 80 of pixel photodiode detectors 70$i,j$. Since the gross location of the virtual input device is known a priori, inverse-transformation of the sub-regions from (x,y,z) to (i,j,k) coordinate space may be done statically. Such operation may be carried out by CPU 160 and a portion of software 170 (or other software) in or storable in memory 150. The inverse-transformation may be done each time system 10' is powered-on, or perhaps periodically, e.g., once per hour, if needed. The inverse-transformed (i,j,k) coordinates define a distorted coordinate system. However rather than attempt to correct or compensate for system distortion, the present invention preferably operates using distorted coordinate information.

As such, detection data is represented by (i,j,k), where (i,j) is detection pixel (i,j) and k is distance. Distance k is the distance from an active light source (e.g., a light source emitting optical energy) to the imaged portion of the target object, plus the return distance from the imagined portion of the target object to pixel (i,j). In the absence of an active light source, k is the distance between pixel (i,j) and the imaged portion of the target object.

Figure 1:
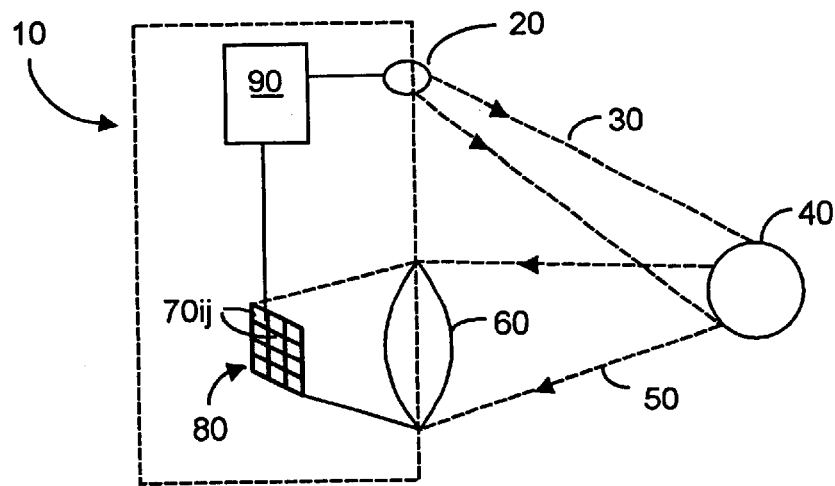
FIG. 1 depicts a generic three-dimensional data acquisition system, according to the prior art.
Figure 2:
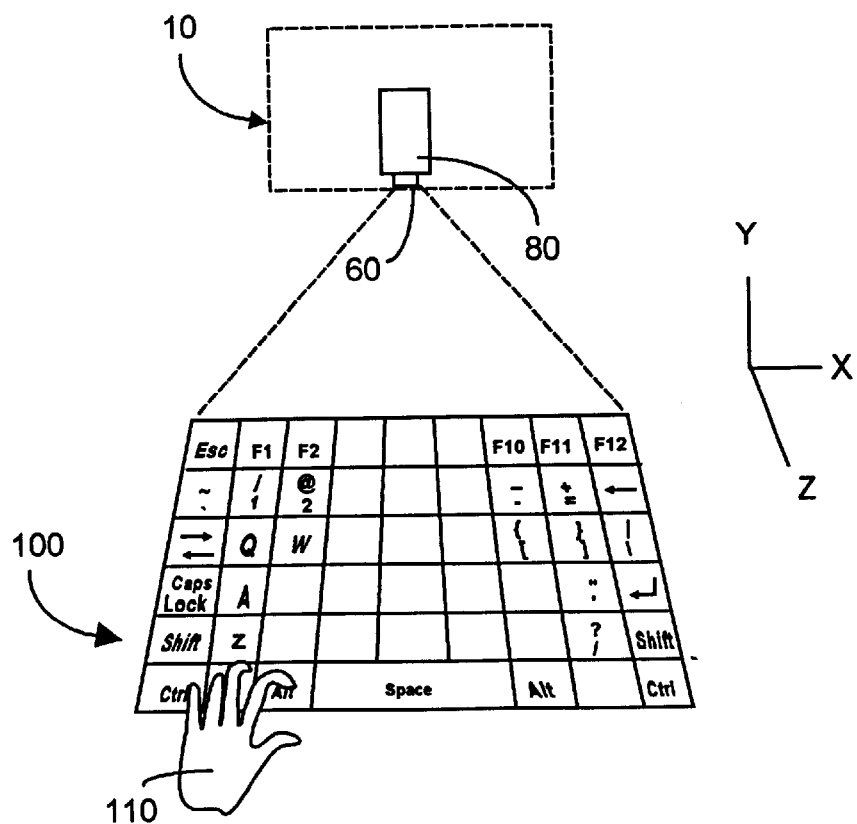
FIG. 2 depicts the system of FIG. 1 in an application that tries to detect interaction between a virtual input device and a user-controlled object.
Figure 3A:
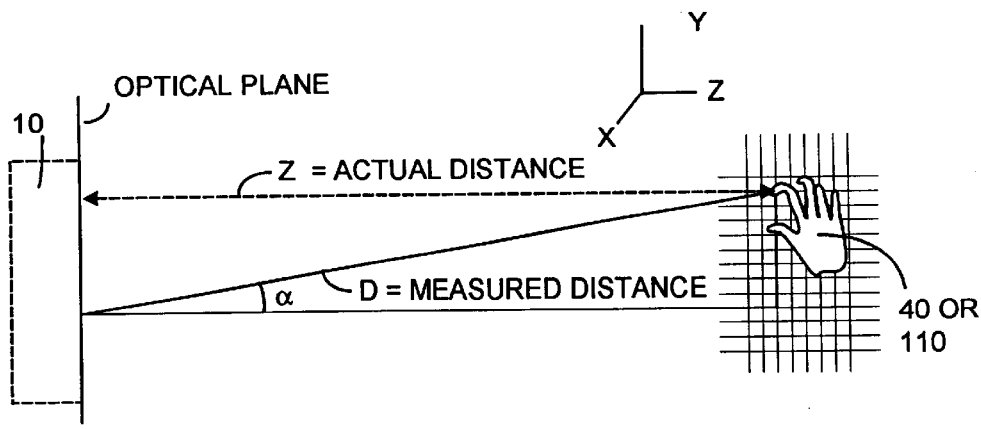
FIGS. 3A–3C depict the nature of geometric error in a three-dimensional imaging system, according to the prior art.
Figure 3B:
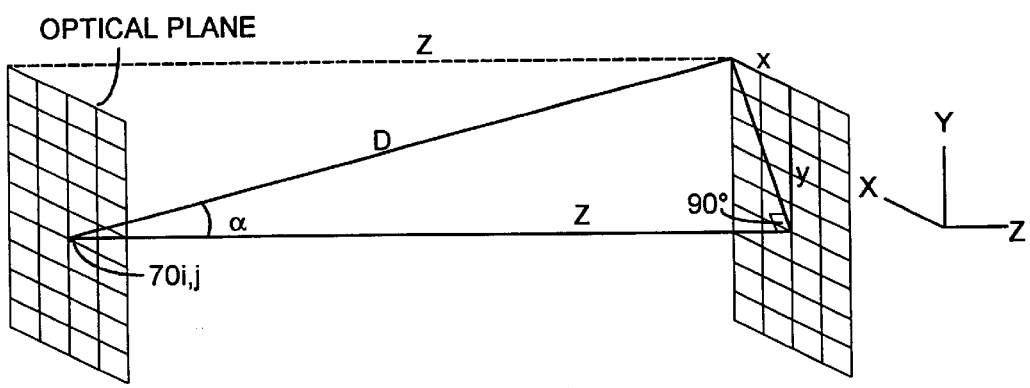

Use of this sensor coordinate system reduces computation cost by avoiding coordinate transformation as the system now relates consistently to the raw data, and avoids any need to correct for geometric error. Referring to FIG. 3B, in a real world system, the relationship between Z and D may be non-linear, yet use of distorted (i,j,k) coordinate space information by the present invention essentially factors out geometric error associated with optical lenses such as lens 60.

Thus, system 10' determines interaction between user-controlled object 110, 140 and virtual input device 100, 100', and/or 100" using mathematical operations that are carried out in the (i,j,k) coordinate space system. As shown herein, the use of distorted data information can substantially factor out various distortion errors that would require compensation or correction in prior art systems.

Figure 6:
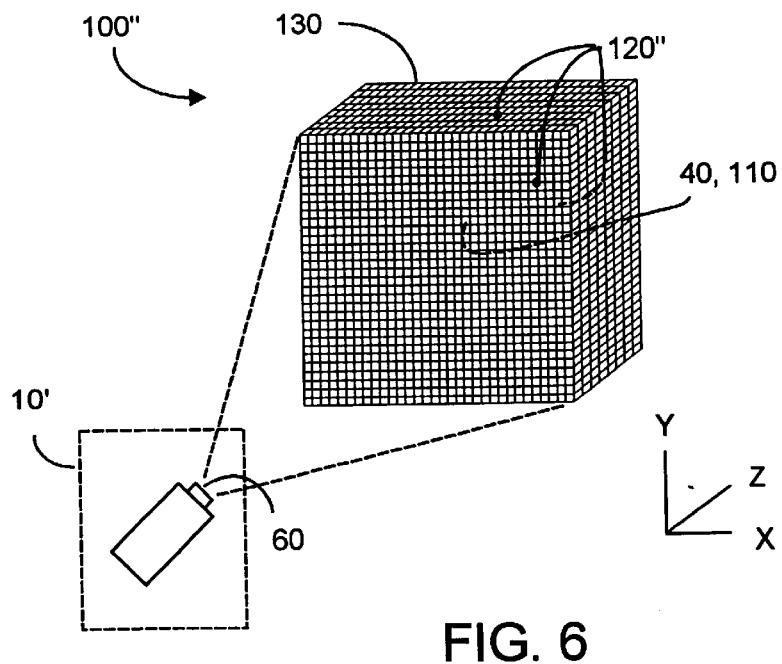
FIGS. 6 and 7 depict a virtual mouse/trackball and virtual pen application using distorted coordinates, according to the present invention.

Advantageously the amount of storage in memory 150 needed to retain the inverse-transformation distortion coordinate information is relatively small and may be pre-calculated. For example, if the virtual input device 100 is a virtual keyboard having perhaps 100 virtual keys, one byte or so of information may be required to store the distortion coordinate information for each virtual key. Thus, as little as perhaps 100 bytes might suffice to store coordinate information for that system of FIG. 5. If, on the other hand, the virtual input device is a virtual trackball/mouse 100" definable as a multi-dimensional virtual cube, more memory may be required. In FIG. 6, if the grid comprises, for example, 100 lines in x-axis, 100 lines in the y-axis, and perhaps 10 lines in the z-axis, 100,000 points of intersection are defined. Assuming about one byte of data per intersection point, perhaps 100 Kbytes of storage would be required to retain distortion coordinates for the virtual input cubic space device shown in FIG. 6. In the system shown in FIG. 7, depending upon the desired granularity of resolution, if 200×200 regions are defined in the virtual work surface, about 40 Kbytes of memory might be required to store the relevant distortion coordinates.

Figure 7:
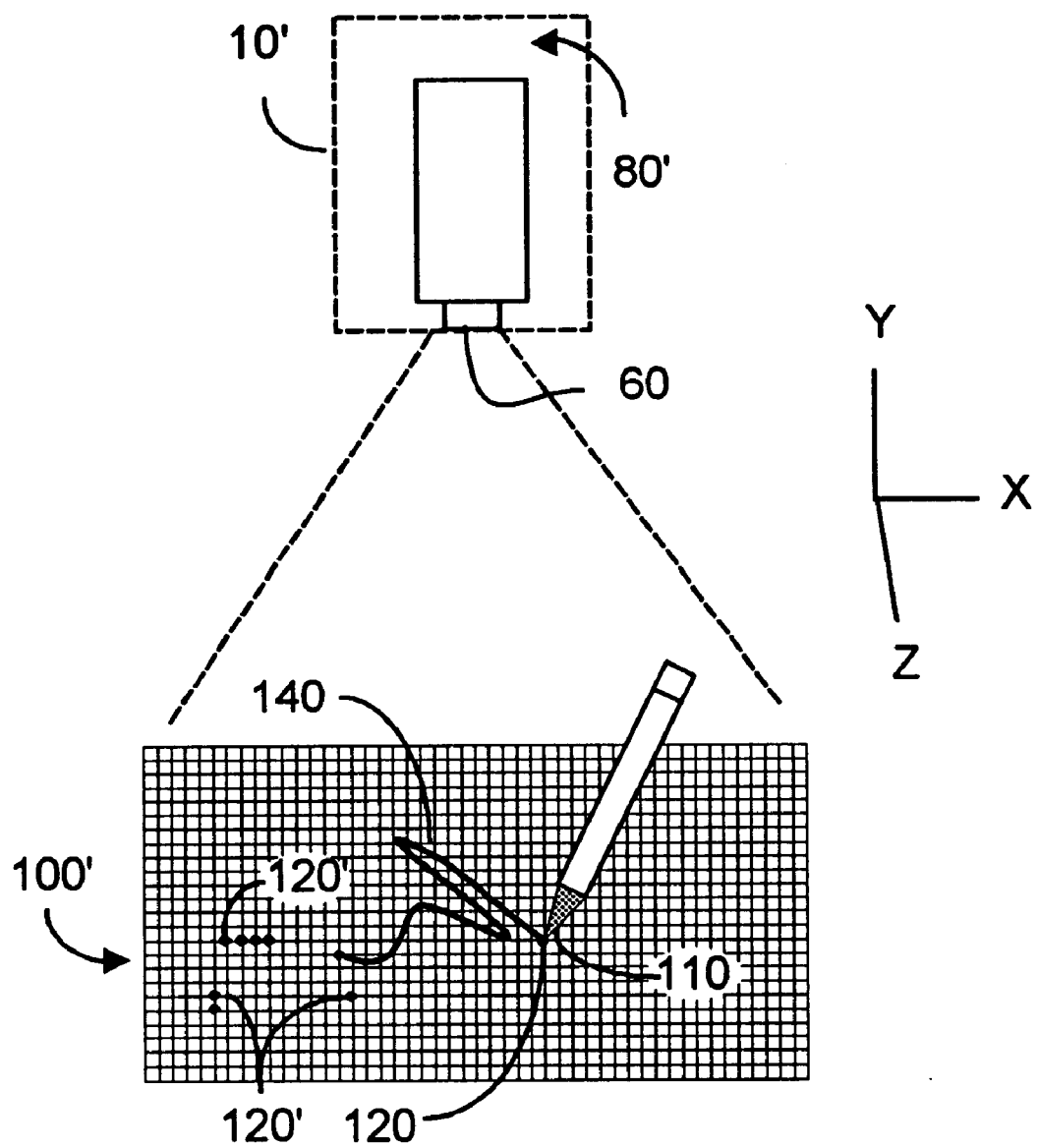

Software 170 upon execution by CPU 160 enables the various systems 10' to detect when an "intersection" between a region of interest in a virtual input device and a tip portion of a user-controlled object occurs. For example, software 170 might discern in FIG. 5 from the TOF (x,y,z)-transformed to (i,j,k) coordinate data that the left "ALT" key is being contacted by a user-controlled object. More specifically, interaction between the distorted coordinate location of the tip of user-controlled object 110 and the distorted coordinate location of sub-region 120 defined in a central region of the virtual "ALT" key would be detected and processed. In this example, software 170 could command system 10' to output as DATA a key scancode representing the left "ALT" key. In a virtual pen application, such as shown in FIG. 7, software 170 could output as DATA the locus of the points traversed by the tip of the pen upon the virtual workpad or trackpad.

Thus it is understood that according to the present invention, individual detectors 70*ij* within array 80 are defined in terms of a sensor (i,j,k) coordinate system, whereas the virtual input keyboard device 100, virtual trackpad device 100', virtual trackball device 100" are originally definable in terms of conventional (x,y,z) coordinates. But rather than use the conventional (x,y,z) coordinate system to determine user-controlled object interaction with one or more virtual input devices, and then have to transform coordinates, the present invention simply represents acquired data using the (i,j,k) coordinate system of sensor array 80, admittedly a distorted coordinate system.

Figure 3C:
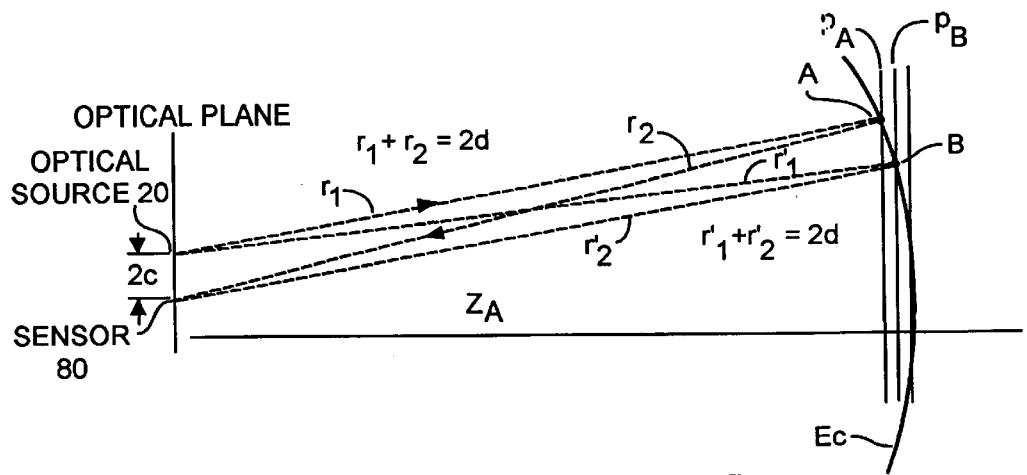
Figure 4A:
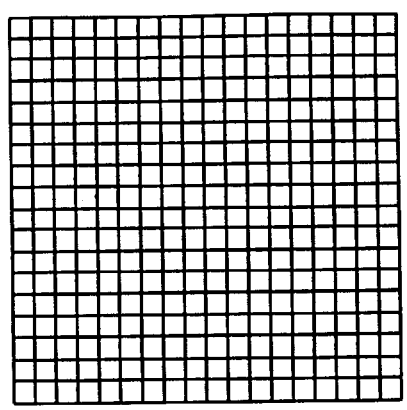
FIG. 4A depicts a cross-hatch image as viewed with a perfect lens.
Figure 4B:
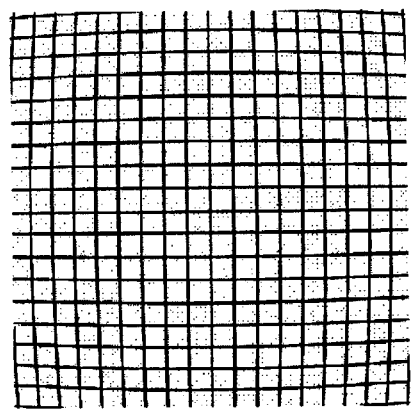
FIG. 4B depicts the image of FIG. 4A as viewed through a lens that exhibits barrel distortion, according to the prior art.
Figure 4C:
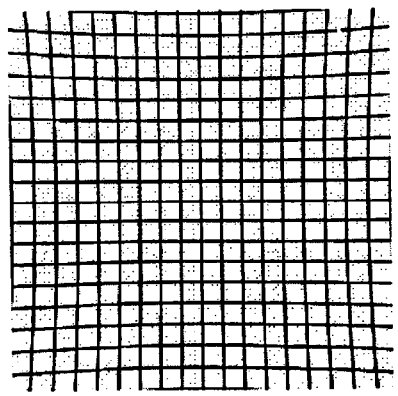
FIG. 4C depicts the image of FIG. 4A as viewed through a lens that exhibits pincushion distortion, according to the prior art.

Note that correction of elliptical error is not required in the present invention. This advantageous result follows because each pixel 70*i,j* in sensor array 80 only receives light from a particular direction when optical lens 60 is disposed in front of the sensor array. Thus, referring to FIG. 3C, point A and point B associated with user-controlled object 40 or 110 and/or virtual input device 100 will be imaged in different pixels within the sensor array.

The present invention defines a distorted coordinate for each region of interest in the virtual input device 100. Referring to FIG. 5, since the virtual keyboard device 100 and the virtual trackpad device 100' are shown as being planar regions of interest associated with these devices will lie essentially on the x-z plane. By contrast, the virtual mouse/trackball input device 100" is three dimensional, and regions of interest associated with device 100" will lie within a virtual volume, e.g, a cube, a sphere, etc.

In system 10' shown in FIG. 5 the virtual input device is a virtual keyboard 100 and a distorted coordinate is defined for a sub-region 120 of each virtual key. Without limitation, the effective area of the sub-region 120 is preferably a single point, e.g., a very small fraction of the effective area of the virtual key, typically much less than 1% of the virtual key area. As will be described, this approach enables system 10' to overcome non-linear pincushion and barrel type distortion associated with lens 60. Rather than correct such non-linear lens distortions on image data, the present invention simply directly uses the distorted coordinates 120 of the virtual keys to overcome the distortion. Since lens distortion for data is not per se corrected, there is a substantial saving in computational cost and overhead. The preferably point sub-regions for the virtual trackpad or writing pad 100' are denoted 120' and will lie on the x-z plane of device 100'. The preferably point sub-regions for the virtual trackpad/mouse pad input device 100" are denoted 120" and will occupy a three-dimension volume defined by the virtual "size" of input device 100".

It will be appreciated that FIG. 5 depicts what may be termed a true three-dimensional imaging system. However, if the range of y-axis positions is intentionally limited (e.g., only small excursions from the x-z plane of the virtual input device are of interest), then system 10' might be referred to as perhaps a 2.5 dimensional system.

Note that in the virtual keyboard application of FIG. 5, since every virtual key's coordinates are distorted coordinates, if the distorted image of a user-controlled object (40, 110), e.g., a fingertip, is very close to or at the distorted coordinate 120 of a virtual key, then the fingertip should indeed be very close to the location of the virtual key. Thus, a distorted image is used to identify fingertip "presses" of virtual keys by using distorted key coordinates. In this fashion, software associated with use of the virtual keyboard application (e.g., perhaps a computer coupled to receive output DATA from system 10') can overcome lens distortions without having to correct for lens distortion during the data processing.

A small object 120 is defined in preferably the center of each key to define that key's distorted coordinate. The image of the various small objects 120 is collected by the imaging sensors (pixels) in sensor array 80, and from the collected image data representing the small object regions 120 is available. As noted, such data are the distorted coordinate of the target virtual key. In FIG. 5, assume it is desired to locate the coordinate of the left "ALT" key on the virtual keyboard. Small object (relative to the "size" of the virtual "ALT" key) 120 is defined at the actual position of virtual "ALT" key and its image data is collected from the three-dimensional sensor array 80.

Suppose that the image of the "ALT" key small target 120 falls upon pixel (s,t) with a distant value d. This means that the coordinate of the virtual "ALT" key is (s,t,d). But since the coordinate of the "ALT" key is collected from actual data, the (s,t,d) coordinate automatically reflects lens distortions associated with that virtual key position. In the same manner, the distorted coordinates for all virtual keys (which is to say for all regions of interest on a virtual input device) are defined.

Just as system 10' may be used in a variety of applications, applicant's use of distorted coordinates for small regions of interest on a virtual input device may be used in many applications. In FIG. 6, a cube-like three-dimensional region 130 is defined that may represent a virtual mouse or virtual trackball input device 100", while in FIG. 7 a planar region 100' is defined as a virtual work surface useable with a pen-like device 110, upon which virtual writing 140 may be traced.

In the more general case of FIG. 6, the three-dimensional region 130 is partitioned into a three-dimensional grid. The above-described method is then used to define a distorted coordinate for each point of intersection 120 of grid lines within the cube. In FIG. 7 the same technique is applied to the two-dimensional grid shown.

In such applications, when the distorted image of the user-controlled object (e.g. the fingertip, the pen tip, etc.) is close to the distorted coordinate 120 of some intersection point in the virtual input device, the user-controlled object is identified as being at the intersection point. This permits tracing movement of the user-controlled object over or through the region of interest in the virtual input device.

It will be appreciated that in a mouse or trackball or virtual writing pad application, tracing a locus of user-controlled object movement may require knowledge of when the object no longer is in contact with the virtual device. Raw data is obtained in (i,j,k) coordinates for regions of interest defined by preferably pin-point sub-regions 120. The only transformation from (i,j,k) to (x,y,z) carried out by the present invention will involve coordinates indicating virtual contact between the user-controlled object and the virtual input device. Thus, if a user moves a fingertip 110 or a stylus to trace a locus of points 140 on a virtual trackpad 100' (see FIG. 7), it is only necessary to transform (i,j,k) to (x,y,z) coordinates for those relatively few locations where there is virtual contact with the virtual trackpad, or where there is movement across the virtual surface of the virtual trackpad. Thus, rather than translate thousands of pixels per frame of acquire image, the number of (i,j,k) to (x,y,z) transformations is substantially less, e.g., for a pin-point region 120'.

Modifications and variations may be made to the disclosed embodiments without departing from the subject and spirit of the invention as defined by the following claims.

What is claimed is:

1. A method to reduce computation in a system that uses an array of sensors definable in (i,j,k) coordinates to detect at least two-dimensional data representing distance between the array and a region of interest definable in (x,y,z) coordinates, the region of interesting including at least one region in which a portion of a user-controlled object can interact with a portion of a virtual input device, the method including the following steps:

(A) calculating and transforming from (x,y,z) coordinates into said (i,j,k) coordinates a distortion coordinate for a sub-portion of said region of interest; and (B) using distortion coordinates calculated at step (A) to determine in said (i,j,k) coordinates distance between an image portion of a target object and a portion of said region of interest.

2. The method of claim 1, wherein step (B) includes determining when said (i,j,k) coordinates are zero;

wherein when said (i,j,k) coordinates are zero, a contact interaction between a portion of said user-controlled object and at least a sub-region of said virtual input device has occurred.

3. The method of claim 1, wherein at step (A) said sub-portion is a point.

4. The method of claim 1, wherein:

said sub-portion includes a point defined on said virtual input device; and step (A) includes at least one of (i) calculating and (ii) transforming distortion coordinates.

5. The method of claim 4, further including storing distortion coordinates so calculated.

6. The method of claim 1, wherein step (A) includes statically doing at least one of (i) calculating and (ii) transforming distortion coordinates.

7. The method of claim 1, wherein said system includes an optical lens associated with said array;

wherein distortion effect upon distance determined at step (B) due to at least one lens distortion selected from non-linear pincushion type distortion and non-linear barrel type distortion is reduced.

8. The method of claim 1, wherein:

said distortion coordinates are calculated for sub-regions on said virtual input device.

9. The method of claim 1, wherein said user-controlled object includes a human user's finger.

10. The method of claim 1, wherein said user-controlled object includes a user-held stylus.

11. The method of claim 1, wherein said virtual input device includes a virtual keyboard.

12. The method of claim 1, wherein said virtual input device includes at least one of a virtual mouse and a virtual trackball.

13. The method of claim 1, wherein said virtual input device includes at least one of a virtual writing pad and a virtual trackpad.

14. The method of claim 1, wherein at step (B) said distance is determined using time-of-flight data.

15. The method of claim 1, wherein:

said virtual input device includes a virtual touch pad across whose virtual surface said user-controlled object may be moved;

further including transforming (i,j,k) coordinates to (x,y,z) coordinates for locations where virtual contact is detected between virtual surface and a portion of said user-controlled object.

16. The method of claim 1, wherein:

said virtual input device includes a virtual touch pad across whose virtual surface said user-controlled object may be moved;

further including transforming (i,j,k) coordinates to (x,y,z) coordinates for locations where movement is detected across said virtual surface by a portion of said user-controlled object.

17. A sub-system to reduce computation in a system that uses an array of sensors definable in (i,j,k) coordinates to detect at least two-dimensional data representing distance between the array and a region of interest definable in (x,y,z) coordinates, the sub-system including:

means for transforming point sub-region locations defined within said region of interest from (x,y,z) coordinate system data to (i,j,k) coordinate system data, and calculating in said (i,j,k) coordinate system a distortion coordinate for each said point-region; and means for using distortion coordinates calculated at step (A) to determine in said (i,j,k) coordinates distance between a sensor in said array and a portion of said region of interest.

18. The sub-system of claim 17, wherein said system is a time-of-flight system.

19. The sub-system of claim 17, wherein said user-controlled object includes at least one of a human finger and a user-held stylus.

20. The sub-system of claim 17, wherein said virtual input device includes at least one of a virtual keyboard, a virtual mouse, a virtual trackball, and a virtual writing pad.

* * * * *